United States Patent
Brecht

(10) Patent No.: US 12,413,425 B2
(45) Date of Patent: Sep. 9, 2025

(54) SYSTEM AND METHODOLOGIES USING GLOBAL ELECTORS WITH REGIONAL CERTIFICATE TRUST LISTS

(71) Applicant: VOLKSWAGEN AKTIENGESELLSCHAFT, Wolfsburg (DE)

(72) Inventor: Benedikt Brecht, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 700 days.

(21) Appl. No.: 17/298,650

(22) PCT Filed: Dec. 6, 2019

(86) PCT No.: PCT/US2019/064856
§ 371 (c)(1),
(2) Date: May 31, 2021

(87) PCT Pub. No.: WO2020/118146
PCT Pub. Date: Jun. 11, 2020

(65) Prior Publication Data
US 2022/0029832 A1   Jan. 27, 2022

Related U.S. Application Data

(60) Provisional application No. 62/776,309, filed on Dec. 6, 2018.

(51) Int. Cl.
*H04L 9/32* (2006.01)
(52) U.S. Cl.
CPC .................................. *H04L 9/3268* (2013.01)
(58) Field of Classification Search
CPC ... H04L 9/3268; H04L 9/3247; H04L 9/3265; H04W 4/46; H04W 12/069; H04W 12/082; G06F 21/64
See application file for complete search history.

(56) References Cited

U.S. PATENT DOCUMENTS

| | | |
|---|---|---|
| 9,525,556 B2 | 12/2016 | Park et al. |
| 11,290,884 B2 | 3/2022 | Kim |
| (Continued) | | |

FOREIGN PATENT DOCUMENTS

| | | |
|---|---|---|
| CN | 105792201 A | 7/2016 |
| WO | 2018182198 A1 | 10/2018 |

OTHER PUBLICATIONS

Brecht et al.; Elector-Based Root Management System to Manage a Public Key Infrastructure; Mar. 1, 2016; downloaded from https://priorart.ip.com/IPCOM/000245336.
Brecht et al.; A Security Credential Management System for V2X Communications; IEEE Transactions on Intelligent Transportation Systems; Dec. 2018; vol. 19, No. 12; downloaded from https://ieeexplore.ieee.org/stamp/stamp.jsp?tp=&amnumber=8309336.
(Continued)

*Primary Examiner* — Hany S. Gadalla
(74) *Attorney, Agent, or Firm* — Barnes & Thornburg LLP

(57) ABSTRACT

A system, methodologies and components for managing trust across multiple Root Certificate Authorities using both electors and regional Certificate Trust Lists (CTLs). Accordingly, systems and methodologies are provided for managing trust across multiple Root CAs and performing such management in a more efficient way than conventionally known or available. More specifically, systems and methodologies are provided that implement a V2I and/or V2X PKI technology implementation.

30 Claims, 1 Drawing Sheet

(56) References Cited

U.S. PATENT DOCUMENTS

| | | | |
|---|---|---|---|
| 2003/0221101 A1* | 11/2003 | Micali | H04L 9/3268 |
| | | | 713/157 |
| 2009/0210703 A1* | 8/2009 | Epstein | H04L 9/006 |
| | | | 713/157 |
| 2011/0191581 A1 | 8/2011 | Shim et al. | |
| 2013/0279392 A1 | 10/2013 | Rubin et al. | |
| 2015/0052352 A1* | 2/2015 | Dolev | H04L 9/3278 |
| | | | 713/156 |
| 2016/0036558 A1* | 2/2016 | Ibrahim | H04W 4/44 |
| | | | 455/297 |
| 2017/0111178 A1 | 4/2017 | Winkelvos et al. | |
| 2017/0243485 A1 | 8/2017 | Rubin et al. | |
| 2018/0004933 A1 | 1/2018 | Nathanson | |
| 2018/0006829 A1* | 1/2018 | Kravitz | H04W 12/06 |
| 2018/0332585 A1* | 11/2018 | Faurie | H04W 72/12 |
| 2019/0044738 A1* | 2/2019 | Liu | H04W 4/40 |
| 2020/0045552 A1* | 2/2020 | Kim | H04W 12/069 |
| 2021/0084461 A1* | 3/2021 | Kim | H04W 4/40 |

OTHER PUBLICATIONS

Kumar; Elector-based Root Management; SCMS CV Pilots Documentation; Apr. 2016; downloaded from https://wiki.campllc.org/display/SCP/Elector-based+Root+Management.

ETSI TS 102 941; Intelligent Transport Systems (ITS); Security; Trust and Privacy Management; May 2018; v1.2.1.

European Commission; Certificate Policy for Deployment and Operation of European Cooperative Intelligent Transport Systems (C-ITS); Result of C-ITS Platform Phase II; Jun. 2018; Release 1.1; downloaded from https://ec.europa.eu/transport/sites/transport/files/c-its_certificate_policy-v1.1.pdf.

Search Report and Written Opinion for International Patent Application No. PCT/US2019/064856; Feb. 25, 2020.

Extended European Search Report; European Patent Application No. 19892333.6; Oct. 4, 2022.

Chinese Office Action, Chinese Patent Application No. 201980080543.X; Apr. 26, 2024.

* cited by examiner

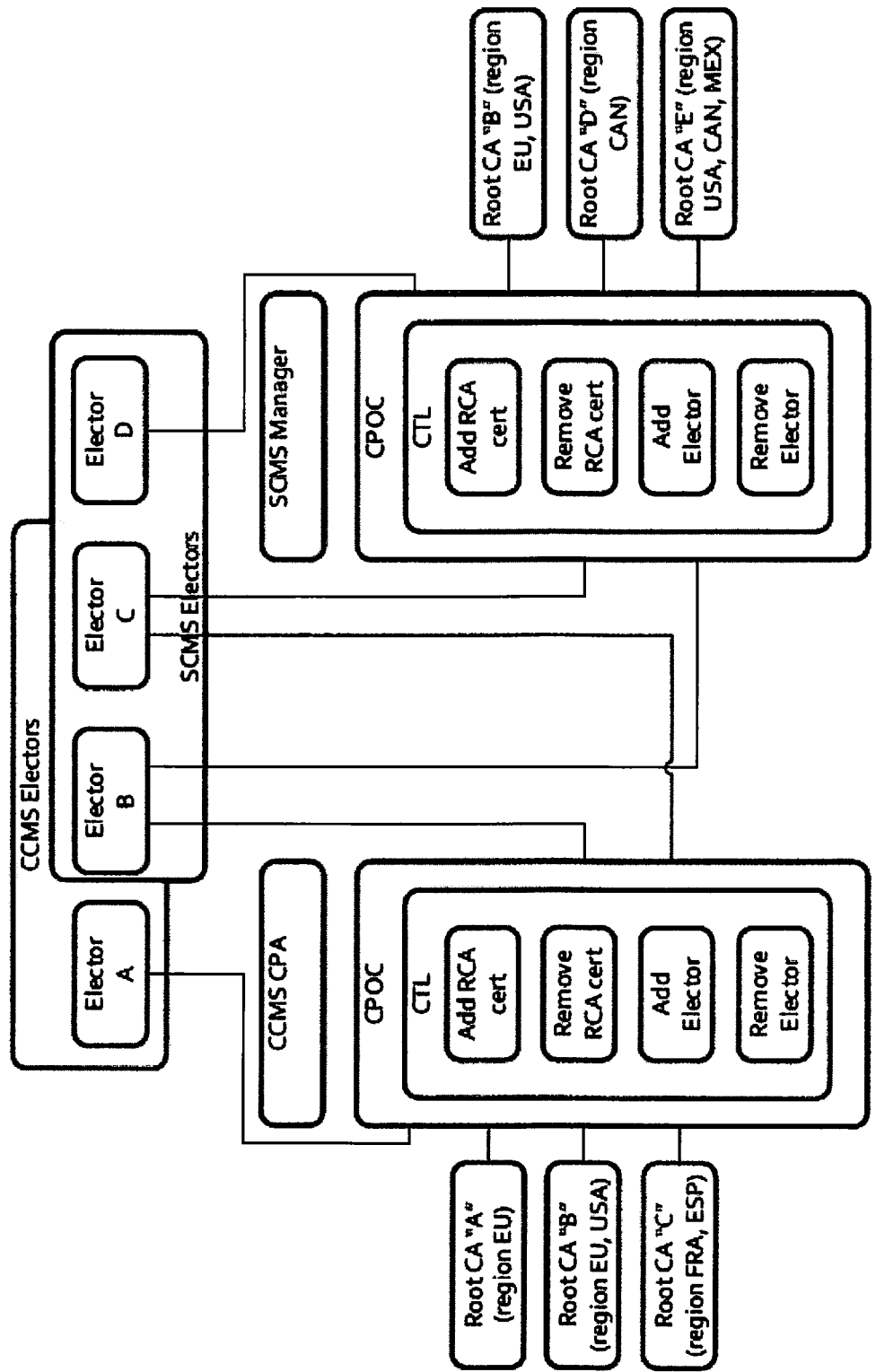

SYSTEM AND METHODOLOGIES USING GLOBAL ELECTORS WITH REGIONAL CERTIFICATE TRUST LISTS

PRIORITY CLAIM

The present application is a national phase of International Patent Application No. PCT/US2019/064856, filed 6 Dec. 2019, which claims priority to and incorporates by reference U.S. Provisional Patent Application No. 62/776,309 filed 6 Dec. 2018.

FIELD

The present disclosure relates to systems, components, and methodologies for managing trust across multiple Root Certificate Authorities (CAs).

BACKGROUND

Vehicle-To-Vehicle communication (also Car2Car, C2C, or Vehicle2Vehicle, V2V) and Vehicle-To-Infrastructure communication (also V2I, Car2Infrastructure, C2I, or Vehicle2Roadside, V2R) are a focal point of automotive research in the 21st century. Collectively, these this communication is encompassed in what may be termed more generally as Vehicle-to-Everything (V2X).

Communication between transportation vehicles or between transportation vehicles and/or traffic infrastructure makes possible a large number of new options, for example, coordination of transportation vehicles with one another or a communication of transportation vehicles with the traffic infrastructure, to provide congestion warnings or facilitate cooperation, e.g., merging, among the transportation vehicles.

The US Department of Transportation (USDOT) issued a proposed rule on Jan. 12, 2017 to mandate the inclusion of V2V technology in light vehicles in the United States to enable communications between nearby transportation vehicles in the form of continuous broadcast of Basic Safety Messages (BSMs) to support V2V safety applications. Interrelated with this is V2I technology, which is meant to enable transportation vehicles to communicate with other entities in their environment such as street lights, buildings, other vehicles and even cyclists or pedestrians.

The diversity of stakeholders in V2X communication (infrastructure operators, vehicle OEMs, special purpose vehicles like emergency or police cars etc.) requires authentication of communicating entities as valid/legitimate identities.

Transportation vehicles designed for V2V or V2I would possess a transceiver that would include a transmitting unit and receiving unit, under the control of at least one processor, so as to be capable to communicate with other transportation vehicles, for instance, via direct radio links or mobile-radio networks. Communication between transportation vehicles via V2V or V2I may proceed in encrypted form, and communication may be secured via Certificates.

Accordingly, this heterogeneous environment requires an effective and efficient way to manage trust amongst those identities. This is particularly challenging when dealing with multiple regional authorities dictating whether identities are valid/legitimate, e.g., in cross-border or international situations, in particular when jurisdictions associated with the regional authorities share common borders.

BSMs may include various pieces of information including the senders' time, position, speed, heading, eventually path history and other relevant information, and are digitally signed. Thus, correctness and reliability of BSMs directly affect the effectiveness of safety applications using the data in those BSMs. For example, sending vehicles digitally sign each BSM to prevent an attacker from inserting false messages. This digital signature enables receiving vehicles to verify the signature before acting on the information included in the BSM. Accordingly, in order to trust a message, the receiving vehicle verifies the digital signature, evaluates each message, validates the certificate of the sending device and then decides whether a warning needs to be output to the driver.

Digital signatures are conventionally known and rely on cryptography, wherein the Root Certificate is the public key certificate that identifies the Root Certificate Authority (CA). In cryptography, a certificate authority or certification authority (CA) is an entity that issues digital certificates. A digital certificate certifies the ownership of the private key by the named subject of the certificate. This allows others (relying parties) to rely upon signatures or on assertions made about the private key that corresponds to the certified public key. Thus, the CA acts as a trusted third party—trusted both by the subject (owner) of the certificate and by the party relying upon the certificate.

Root Certificates are self-signed and form the basis of a Public Key Infrastructure (PKI), which defines the format of public key certificates. Accordingly, Internet Engineering Task Force (IETF) X.509 certificates are conventionally used in many Internet protocols, including Transport Layer Security (TLS)/Secure Sockets Layer (SSL), which is the basis for Hypertext Transfer Protocol Secure (HTTPS), the secure protocol for browsing the web. Although, conventionally known V2X PKI is not based on the IETF X.509 Standard of the conventional IETF X.509 web PKI, all PKI technology for secure electronic signature schemes depend on a set of Root Certificates. Thus, PKI technology facilitates and manages digital certificates for establishing and managing trust among participants.

SUMMARY

According to the present disclosure, systems and methodologies are provided for managing trust across multiple Root CAs and performing such management in a more efficient way than conventionally known or available.

According to the present disclosure, systems and methodologies are provided that implement a V2I and/or V2X PKI technology implementation that provides further optimization of the Institute of Electrical and Electronics Engineers (IEEE) 1609.2 Standard rather than the IETF X.509 standard.

In accordance with disclosed embodiments, the systems and methodologies are configured to use a different set of protocols rather than the conventional IETF, TLS, SSL and/or HTTPS protocols.

As a result, in accordance with disclosed embodiments, a technical solution is provided which manages trust across multiple Root CAs using both Electors and regional Certificate Trust Lists (CTLs) in a novel and inventive way.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying FIGURES in which:

FIG. 1 is an illustrative diagram of a system provided in accordance with at least one disclosed embodiment.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

As explained above, PKI technology supports electronic signature schemes dependent on a set of Root Certificates. Accordingly, PKI technology facilitates and manages digital certificates and is necessary for building trust among participants and for proper functioning of the V2X system (which enables both V2V and V2I functionality).

It is known that Certificate Authorities (CAs) can issue multiple certificates in the form of a tree structure, wherein a Root Certificate is the top-most certificate of the tree. In such a configuration, the private key of the Root Certificate is used to "sign" other certificates. Thus, in such an implementation, all certificates signed by the Root Certificate private key inherit the trustworthiness of the root certificate. In this way, a signature by a Root Certificate is comparable to "notarizing" an individual's identity in the physical world because the notary is a trusted entity.

It is also known that certificates signed by a private key of a Root Certificate that, in turn, sign other certificates are referred to as Intermediate Certificates or Subordinate CA certificates. As is known, certificates further "down" that tree also depend on the trustworthiness of these Intermediate Certificates.

Disclosed embodiments provide a mechanism and methodologies for management of trust across multiple Root CAs in a more efficient way than conventionally known or available.

In accordance with disclosed embodiments, the technical solution uses electors to enable the use of the same Elector and Root CA certificates across a plurality of jurisdictions and/or a plurality of markets. See the Internet websites located at ieeexplore.ieee.org/stamp/stamp.jsp?tp=&arnumber=8309336 (incorporated by reference in its entirety) and priorart.ip.com/IPCOM/000245336 (incorporated by reference in its entirety). Electors, together have the power to change and manage trust relationships.

In accordance with at least some disclosed embodiments, these electors may be used in combination with Certificate Trust Lists (which are described in ETSI Technical Standard 102 941: see the Internet website located at www.etsi.org/deliver/etsi_ts/102900_102999/102941/01.02.01_60/ts_102941v010201p.pdf; (incorporated by reference in its entirety) See also the Internet website located at ec.europa.eu/transport/sites/transport/files/c-its_certificate_policy-v1.1.pdf (incorporated by reference in its entirety), which gives an example of a governance policy for the EU PKI and provides additional information regarding implementation of such systems).

To most effectively understand the technical problem addressed by the technical solution of the present invention, it should be understood that, conventionally, the technical problem of trust management across multiple Root CAs has been solved regionally with slightly different approaches. For example, the European Union sector has proposed to follow an approach with a single Central Trust List Manager as described in the Internet website located at ec.europa.eu/transport/sites/transport/files/c-its_certificate_policy-v1.1.pdf (incorporated by reference in its entirety).

To the contrary, the United States sector has proposed to use electors as described in the Internet website located at ieeexplore.ieee.org/stamp/stamp.jsp?tp=&arnumber=8309336 (incorporated by reference in its entirety). Although it has been assumed that Canada and potentially Mexico will follow that approach, it is unclear how V2V, V2I and V2X can and will be implemented for cross-border traffic.

Electors are independent of the PKI due to not signing certificates, but rather dedicated trust management messages. Therefore, electors can operate independent of any region.

Accordingly, a regional authority (e.g., a security credential management system ("SCMS") Manager or a Certificate Policy Authority (CPA) of a C-ITS credential management system ("CCMS") can decide, which subset of the global electors are legitimate within their regional jurisdiction by identifying their certificates.

Those certificates may then be installed securely in all devices, e.g., transportation vehicle equipment and/or infrastructure components that operate under the jurisdiction of the regional authority.

Thus, for example, in one potential implementation, disclosed embodiments may enable a regional authority to modify legitimate certificates in their jurisdiction using elector-based root management that utilizes ballots with endorsements. In such an implementation, whenever the regional authority wants to add or remove a certificate from those being legitimate within their jurisdiction, the regional authority could ask a majority of the identified electors to sign a ballot to endorse or revoke a certificate. Based on the ballot, the regional authority may add the ballot to their respective trust list. It should be understood that there are alternative approaches to such an implementation that do not use ballots but, instead, use the CTL approach in alternative ways.

Regardless of implementation of the modification of the CTL, in accordance with disclosed embodiments, all devices within the jurisdiction of the regional authority can download the trust list and add or remove the respective certificate from their trust store based on the initial trust into the identified electors.

In accordance with at least some disclosed embodiments, the region or jurisdiction for which an added or revoked certificate is valid/legitimate can be expressed in the certificate itself. For example, the certificate can identify the jurisdiction, e.g., US, MEX and CAN as valid regions at the same time, as defined in IEEE the 1609.2 Standard (incorporated herein by reference in its entirety).

Further, it should be understood that, in accordance with disclosed embodiments, elector and Root CA certificates may be re-used even on a global scale. More specifically, the region restriction for a Elector or Root CA certificate can contain multiple countries/regions on different continents, but the validity/legitimacy of the Root CA would still be determined by the respective regional authority expressed through the regional authority's respective CTL.

As a result, in accordance with the disclosed embodiments, the technical solution of using electors provides a defined way to manage trust anchors in a standardized manner that works even if there is a trust compromise on the highest level.

In addition, disclosed embodiments may also provide additional utility in that the resulting system for root certificate management can be provided as part of a disaster recovery plan that may be tested on a regular basis (whenever there is a regular rollover). Furthermore, additional utility is provided in that the root certificate management system may work automatically on the device (e.g., equipment/component) level without the requirement to have physical access to the device or to have the device in a secure environment. This automation may also assist in avoiding mistakes and reducing the recovery time for the system for addressing such mistakes. An example of the proposed scheme is depicted in FIG. 1.

FIG. 1 illustrates a system of at least one embodiment of the present disclosure. In such embodiment, global electors A, B, C, and D may be selected as legitimate electors for a plurality of jurisdictions. For instance, electors A, B, and C may be assigned to one or more jurisdictions 110 (which may be, for example, but without limitation, a CCMS). The electors B, C, D, may be additionally assigned to one or more jurisdictions 120 (which may be, for example, but without limitation, a SCMS). Thus, some of the electors, e.g., electors B and C, are used across jurisdictions 110 and 120. As a result, in this illustrative example, both the CCMS CPA 115 and the SCMS Manager 125 would include electors B and C on their Certificate Points Of Contact (CPOC) CTLs 117, 127

In this way, disclosed embodiments can use elector certificates in more than one jurisdiction and, optionally, many jurisdictions. Through the global re-use of an elector certificate, the costs of establishing and operating an elector can be divided across multiple jurisdictions so as to improve the overall business case of running a V2X PKI better.

Accordingly, disclosed embodiments may use Root CA certificates across the globe, that is, in more than one jurisdiction and, optionally, many jurisdictions. Through the global re-use of Root CA certificates, the number of required Root CA certificates for an international organization with business in various operational regions can be reduced and might make the business case of establishing and operating a Root CA better.

Accordingly, disclosed embodiments may enable the use of IEEE 1609.2 Peer-to-Peer Certificate Distribution (P2PCD) for a top level of the trust chain on an international basis across the globe. As a result, the disclosed embodiments enable replication of this benefit from the US sector to a global scale.

It should be understood that disclosed embodiments may be implemented in conjunction with devices, components, equipment, for use in one or more components of transportation vehicles including, but not limited to, autonomous driving systems and driver assistance systems included in automotive vehicles. The utility of the functionality provided by the disclosed embodiments within those technical contexts should be readily understood. However, the scope of the innovative concepts disclosed herein is not limited to those technical contexts. Therefore, it should be understood that the disclosed embodiments provide utility in all aspects of device, component and equipment management.

The terminology that is used herein serves only for the description of certain disclosed embodiments and is not intended to restrict the disclosed embodiments. As used herein, the singular forms "a", "an" and "the" are also to imply the plural forms, unless the context unambiguously specifies otherwise. Furthermore, it should be made clear that expressions such as, for example, "contains", "containing", "exhibits", "includes", "including" and/or "exhibiting", as used herein, specify the presence of stated features, integers, operations, procedures, elements, and/or components but do not exclude the presence or addition of one or more features, integers, operations, procedures, elements, components and/or groups thereof.

Unless otherwise defined, all terms (including technical and scientific terms) used herein have the same meaning that an average technically skilled person in the field to which the disclosed embodiments pertain ascribes to them. Furthermore, it should be made clear that expressions, for example, those which are defined in generally used dictionaries, are to be interpreted as having the meaning that is consistent with their meaning in the context of the pertinent technology, and are not to be interpreted in an idealized or excessively formal sense, unless this is expressly defined herein.

It should be understood that, although not discussed in great detail, the disclosed embodiments may be implemented in a heterogeneous environment that includes both V2I infrastructure and a plurality of transportation vehicles enabled for V2V communication, wherein multiple regional authorities dictating whether identities are valid/legitimate, e.g., in cross-border or international situations. As such, it should be understood that such transportation vehicles may be configured to enable V2V and V2I communication by including equipment that monitors and/or communicates with transportation vehicle components that enable generation, transmission and/or receipt of BSMs originating in other V2V enabled vehicles and V2I infrastructure components via a V2V and/or V2I interface. Accordingly, for example, it should be understood that such on-vehicle equipment (e.g., various sensor and monitoring information coupled to a transmitting unit and receiving unit of a transceiver under the control of at least one processor) to provide such interfaces could be configured to determine or sense that a transportation vehicle's flashers had been activated and to enable transmission of one or more BSMs indicating such activation to other V2V enabled transportation vehicles and/or V2I infrastructure components. Thus, the one or more BSMs could be in encrypted form, and communication secured via Root Certificates to increase security and the ability to authenticate such BSMs.

Accordingly, it should be understood that the equipment provided on the transportation vehicle to provide this functionality may include an arbitrary controller or processor or to a programmable hardware component. Likewise, V2I infrastructure components may be similarly implemented. Thus, for example, the equipment and components may be realized as software that has been programmed for a corresponding hardware component. In this respect, the V2V equipment and V2I components may be implemented as programmable hardware with correspondingly adapted software, e.g., arbitrary processors, such as digital signal processors (DSPs), may come into operation based on the novel and inventive functionality disclosed herein. However, disclosed embodiments in this case are not restricted to a particular type of processor. Thus, arbitrary processors or even several processors may be configured for implementing the equipment and components.

In particular, transportation vehicle equipment may include a vehicle-to-vehicle interface that corresponds to a direct vehicle-to-vehicle radio interface and may be designed for a direct data communication with the one or more further transportation vehicles. Accordingly, the vehicle equipment may enable exchange of data messages with transportation vehicles in its neighborhood via the vehicle-to-vehicle interface. The data messages, e.g., BSMs, may, for instance, be transmitted periodically—that is to say, data, for instance, data concerning a status of the transportation vehicle, perhaps its speed, position, etc., are transmitted with a defined repetition frequency.

Alternatively or additionally, the data messages may be transmitted in event-based manner—that is to say, on the basis of an event such as, for example, the detection of an end of a traffic jam or a detection of a slippery roadway. Event-based data messages can also be repeated, for instance, with a defined repetition duration and repetition frequency, perhaps to reach more recipients or to increase a probability of a reception of the data messages. Further, Cooperative Awareness Messages (CAMs: periodic data messages that a transportation vehicle sends out to make its presence known to other transportation vehicles), Decentralized Environmental Notification Message (DENM: which are an example of event-based data messages, for example, including current information about a transportation vehicle, for instance, the position and the motion vector, but also, for instance, sensor data such as an acceleration, speed, or computed information such as the information about the end of the traffic jam.

For the purposes of this disclosure, the phrase "autonomous and/or assistive functionality" refers to functionality that enables the partial, full or complete automation of vehicular control ranging and encompassing what has presently come to be known as the five levels of driving automation. Thus, it should be understood that autonomous and/or assistive functionality refers to operations performed by a vehicle in an automated manner by on-vehicle equipment or the output of alerts, prompts, recommendations or directions to a user, wherein these outputs are generated in an automated manner by on-vehicle equipment. Moreover, autonomous and/or assistive functionality may include driver assistance functionality (level one) wherein on-vehicle equipment assists with, but does not control, steering, braking and/or acceleration, but a driver ultimately controls accelerating, braking, and monitoring of a vehicle surroundings.

It should be understood, therefore, that such autonomous and/or assistive functionality may also include lane departure warning systems which provide a mechanism to warn a driver when a transportation vehicle begins to move out of its lane (unless a turn signal is on in that direction) on freeways and arterial roads. Such systems may include those that warn the driver (Lane Departure Warning) if the vehicle is leaving its lane (visual, audible, and/or vibration warnings) and which warn the driver and, if no action is taken, automatically take steps to ensure the vehicle stays in its lane (Lane Keeping System).

Likewise, autonomous and/or assistive functionality may include partial automation (level two), wherein the transportation vehicle assists on steering or acceleration functions and correspondingly monitoring vehicle surrounding to enable a driver to disengage from some tasks for driving the transportation vehicle. As understood in the automotive industry, partial automation still requires a driver to be ready to assume all tasks for transportation vehicle operation and also to continuously monitor the vehicle surroundings at all times.

Autonomous and/or assistive functionality may include conditional automation (level three), wherein the transportation vehicle equipment is responsible for monitoring the vehicle surroundings and controls steering, braking and acceleration of the vehicle without driver intervention. It should be understood that, at this level and above, the on-vehicle equipment for performing autonomous and/or assistive functionality will be interfacing with or include navigational functionality so that the components have data to determine where the vehicle is to travel. At level three and above, a driver is theoretically permitted to disengage from monitoring vehicle surroundings but may be prompted to take control of the transportation vehicle operation under certain circumstances that may preclude safe operation in a conditional automation mode.

Thus, it should be understood that autonomous and/or assistive functionality may include systems which take over steering, keep the transportation vehicle centered in the lane of traffic.

Likewise, autonomous and/or assistive functionality may include high automation (level four) and complete automation (level five), wherein on-vehicle equipment enable automated steering, braking, and accelerating, in response to monitoring of the surroundings of the vehicle in an automated manner without driver intervention.

Therefore, it should be understood that autonomous and/or assistive functionality may require monitoring of surroundings of a vehicle including the vehicle roadway as well as identification of objects in the surroundings so as to enable safe operation of the vehicle in response to traffic events and navigational directions, wherein that safe operation requires determining when to change lanes, when to change directions, when to change roadways (exit/enter roadways), when and in what order to merge or traverse a roadway junction, and when to use turn signals and other navigational indicators to ensure other vehicles/vehicle drivers are aware of upcoming vehicle maneuvers.

Further, it should be understood that high and full automation may include analysis and consideration of data provided from off-vehicle sources in order to make determinations of whether such levels of automation are safe. For example, autonomous and/or assistive functionality at such levels may involve determining the likelihood of pedestrians in the surroundings of a transportation vehicle, which may involve referencing data indicating whether a present roadway is a highway or parkway. Additionally, autonomous and/or assistive functionality at such levels may involve accessing data indicating whether there is a traffic jam on the present roadway.

With this understanding of potential implementation of on-vehicle sensors for autonomous and/or assistive functionality in mind, presently disclosed systems, components, and methodologies may be provided to securely communicate and authenticate data gathered from on-vehicle sensors to assist in autonomous and/or assistive functionality, in particular, autonomous control and/or assistive control that require or enable cooperative or collaborative operation of a plurality of transportation vehicles. In such situations, the correctness and authenticity of communicated data is key to safety of transportation vehicles participating in collaborative operations, e.g., lane merging, passing, platooning of vehicles, etc.

Thus, it should be understood that, in accordance with at least some embodiments, the digital signing of a BSM may be analyzed by one or more transportation vehicle safety applications running on a transportation vehicle of the plurality of transportation vehicles that received the BSM via V2V communication prior to the transportation vehicle safety application accessing data of the BSM. Likewise, the digital signing of the BSM is analyzed by one or more transportation vehicle safety applications running on a transportation vehicle of the plurality of transportation vehicles that received the BSM via V2V communication prior to the transportation vehicle safety application accessing data of the BSM.

A further disclosed embodiment may provide a computer program for implementing the functionality disclosed herein when the computer program runs on a computer, on a processor or on a programmable hardware component. A further disclosed embodiment may also provide a digital storage medium that is machine-readable or computer-readable and that exhibits electronically readable control signals that can interact with a programmable hardware component in such a way that disclosed functionality is provided.

Depending upon implementation requirements, disclosed embodiments may have been implemented in hardware or in software. The implementation may carried out using a digital storage medium, for instance, a floppy disk, a DVD, a Blu-ray disc, a CD, a ROM, a PROM, an EPROM, an EEPROM or a flash memory, a hard disk, or another magnetic or optical memory on which electronically readable control signals are stored that can interact or interact with a programmable hardware component in such a manner that the respective method is carried out.

A programmable hardware component may be constituted by a processor, a Computer Processor (CPU: central processing unit), a graphics processor (GPU: Graphics Processing Unit), a computer, a computer system, an Application-Specific Integrated Circuit (ASIC), an Integrated Circuit (IC), a one-chip system (SOC=System On Chip), a programmable logic element or a Field-Programmable Gate Array with a microprocessor (FPGA).

The digital storage medium may, therefore, be machine-readable or computer-readable. Accordingly, some disclosed embodiments include a data carrier that exhibits electronically readable control signals that are capable of interacting with a programmable computer system or with a programmable hardware component in such a manner that one of the methods described herein is carried out. A disclosed embodiment is consequently a data carrier (or a digital storage medium or a computer-readable medium) on which the program for implementing one of the methods described herein has been recorded.

In general, disclosed embodiments may be implemented as a program, firmware, computer program or computer-program product having a program code, or as data, the program code or the data being effective to implement one of the methods when the program runs on a processor or on a computer-programmable hardware component. The program code or the data may, for instance, also have been stored on a machine-readable carrier or data carrier. The program code or the data may be present as, amongst other things, source code, machine code or byte code, and also as other intermediate code.

A program according to at least one disclosed embodiment can put one of the methods into effect during its implementation, for instance, by virtue of the fact that the program reads out memory locations or writes a data item or several data items to the memory locations, as a result of which, where appropriate, switching operations or other operations are brought about in transistor structures, in amplifier structures or in other electrical, optical or magnetic components or in components operating in accordance with a different functional principle. Accordingly, data, values, sensor values or other information can be acquired, determined or measured by a program, by reading a memory location. A program can, therefore, acquire, determine or measure quantities, values, measured variables and other information by reading out one or more memory locations, and can also bring about, cause or carry out an action and also drive other instruments, machines and components by writing to one or more memory locations.

The embodiments described above represent merely an illustration of the principles of the disclosure. It will be understood that modifications and variations of the arrangements and particulars described herein will be clear to other persons skilled in the art. Therefore, it is intended that the disclosure be restricted only by the scope of protection of the following claims and not by the specific particulars that have been presented herein on the basis of the description and the elucidation of the disclosed embodiments. The features disclosed in the foregoing description, in the following claims and in the appended FIGURES may be of importance and implemented both individually and in arbitrary combination for the realization of an embodiment in its various configurations.

The invention claimed is:

1. A system for managing trust across a plurality of root certificate authorities for use in vehicle-to-vehicle (V2V) communication between at least two of a plurality of transportation vehicles in the form of continuous broadcast of Basic Safety Messages (BSMs), the system comprising:

transportation vehicle equipment located on a transportation vehicle of the plurality of transportation vehicles, the transportation vehicle equipment including a transceiver and at least one processor controlling the transceiver, wherein the at least one processor is configured to control the transceiver to provide V2V communication via at least one communication link between the transportation vehicle equipment of the transportation vehicle and transportation vehicle equipment of other transportation vehicles of the plurality of transportation vehicles, wherein the at least one communication link is provided via either direct radio link or communication via mobile-radio network, wherein communication of the BSMs on the at least one communication link is secured via root certificate such that each BSM is digitally signed using a root certificate associated with the transportation vehicle transmitting the BSM; and at least one regional root certificate authority of a plurality of regional root certificate authorities that dictates whether identities that associate root certificates with respective transportation vehicles of the plurality of transportation vehicles are legitimate for a jurisdiction under authority of the at least one regional root certificate authority, wherein the jurisdiction includes at least one country associated with the at least one regional root certificate authority, wherein at least two of the plurality of regional root certificate authorities maintain Certificate Trust Lists that include at least one common root certificate identified as a legitimate root certificate in each of the respective jurisdictions of the at least two regional root certificate authorities, each regional root certificate authority being configured to modify Certificate Trust Lists that list legitimate certificates in their jurisdiction using elector-based root management, wherein when a region restriction for a root certificate contains multiple countries, the legitimacy of the root certificate is determined by the respective regional root certificate authority expressed through the regional root certificate authority's respective Certificate Trust List, wherein the elector-based root management uses identified electors to manage trust anchors of the respective Certificate Trust Lists in a standardized manner, wherein root certificates are used across multiple countries and identify the jurisdictions for which the root certificate is valid under IEEE 1609.2 Peer-to-Peer Certificate Distribution such that the elector-based root management functions even if there is a trust compromise on a top level of a trust chain, and wherein the identified electors include at least one common elector identified as legitimate within the respective jurisdictions of the at least two regional root certificate authorities.

2. The system of claim 1, wherein the elector-based root management is performed using ballots with endorsements, wherein a regional root certificate authority seeking to add or remove a root certificate from its Certificate Trust List queries a majority of electors identified by the regional root certificate authority to sign a ballot to endorse or revoke a root certificate.

3. The system of claim 1, wherein the plurality of regional root certificate authorities are associated with respective jurisdictions that share a common international border.

4. The system of claim 1, wherein the regional root certificate authorities each issue digital certificates including root certificates, wherein the digital certificates certify ownership of a public key by the named subject of the digital certificate.

5. The system of claim 1, wherein BSMs each include transportation vehicle specific data including time, location, speed, and heading of the BSM transmitting transportation vehicle.

6. The system of claim 1, wherein the digital signing of the BSM serves as authentication of correctness and reliability of data included in the BSM.

7. The system of claim 1, wherein the digital signing of the BSM is analyzed by one or more transportation vehicle safety applications running on a transportation vehicle of the plurality of transportation vehicles that receives the BSM via V2V communication prior to the transportation vehicle safety application accessing data of the BSM.

8. The system of claim 7, wherein the one or more transportation vehicle safety application is an autonomous or assistive driving application.

9. The system of claim 1, wherein the system works automatically on the transportation vehicle equipment without requiring physical access to the transportation vehicle equipment or having the transportation vehicle equipment in a secure environment.

10. The system of claim 9, wherein the automation assists in avoiding mistakes and reducing the recovery time for the system for addressing such mistakes.

11. A method for managing trust across a plurality of root certificate authorities for use in vehicle-to-vehicle (V2V) communication between at least two of a plurality of transportation vehicles in the form of continuous broadcast of Basic Safety Messages (BSMs), the method comprising:

controlling transmission of V2V communication from transportation vehicle equipment located on a transportation vehicle of the plurality of transportation vehicles, the transportation vehicle equipment including a transceiver and at least one processor controlling the transceiver, wherein the at least one processor controls the transceiver to provide V2V communication via at least one communication link between the transportation vehicle equipment of the transportation vehicle and transportation vehicle equipment of other transportation vehicles of the plurality of transportation vehicles, wherein communication link is provided via either direct radio link or communication via mobile-radio network, wherein communication of the BSMs on the communication link is secured via root certificate such that each BSM is digitally signed using a root certificate associated with the transportation vehicle transmitting a BSM, wherein at least one regional root certificate authority of a plurality of regional root certificate authorities dictate whether identities that associate root certificates with respective transportation vehicles of the plurality of transportation vehicles are legitimate for a jurisdiction for the at least one regional root certificate authority, wherein the jurisdiction includes at least one country associated with the at least one regional root certificate authority, wherein at least two of the plurality of regional root certificate authorities maintain Certificate Trust Lists that include at least one common root certificate identified as a legitimate root certificate in each of the respective jurisdictions of the at least two regional root certificate authorities, each regional root certificate authority being configured to modify Certificate Trust Lists that list legitimate certificates in their jurisdiction using elector-based root management, wherein, when a region restriction for a root certificate contains multiple countries, the legitimacy of the root certificate is determined by the respective regional root certificate authority expressed through the regional root certificate authority's respective Certificate Trust List, wherein the elector-based root management uses identified electors to manage trust anchors of the respective Certificate Trust Lists in a standardized manner, wherein root certificates are used across multiple countries and identify the jurisdictions for which the root certificate is valid under IEEE 1609.2 Peer-to-Peer Certificate Distribution such that the elector-based root management functions even if there is a trust compromise on a top level of a trust chain, and wherein the identified electors include at least one common elector identified as legitimate within the respective jurisdictions of the at least two regional root certificate authorities.

12. The method of claim 11, wherein the elector-based root management is performed using ballots with endorsements, wherein a regional root certificate authority seeking to add or remove a root certificate from its Certificate Trust List queries a majority of electors identified by the regional root certificate authority to sign a ballot to endorse or revoke a root certificate.

13. The method of claim 11, wherein the plurality of regional root certificate authorities are associated with respective jurisdictions that share a common international border.

14. The method of claim 11, wherein the regional root certificate authorities each issue digital certificates including root certificates, wherein the digital certificates certify ownership of a public key by the named subject of the digital certificate.

15. The method of claim 11, wherein BSMs each include transportation vehicle specific data including time, location, speed, and heading of the BSM transmitting transportation vehicle.

16. The method of claim 11, wherein the digital signing of the BSM serves as authentication of correctness and reliability of data included in the BSM.

17. The method of claim 11, wherein the digital signing of the BSM is analyzed by one or more transportation vehicle safety applications running on a transportation vehicle of the plurality of transportation vehicles that receives the BSM via V2V communication prior to the transportation vehicle safety application accessing data of the BSM.

18. The method of claim 17, wherein the one or more transportation vehicle safety application is an autonomous or assistive driving application.

19. The method of claim 11, wherein the method is implemented to work automatically on the transportation vehicle equipment without requiring physical access to the transportation vehicle equipment or having the transportation vehicle equipment in a secure environment.

20. The system of claim 19, wherein the automation assists in avoiding mistakes and reducing the recovery time for the system for addressing such mistakes.

21. A non-transitory computer readable medium including a computer program that has computer software code instructions, which, when implemented on at least one computer processor, perform a method for managing trust across a plurality of root certificate authorities for use in vehicle-to-vehicle (V2V) communication between at least two of a plurality of transportation vehicles in the form of continuous broadcast of Basic Safety Messages (BSMs), the method comprising:

controlling transmission of V2V communication from transportation vehicle equipment located on a transportation vehicle of the plurality of transportation vehicles, the transportation vehicle equipment including a transceiver and at least one processor controlling the transceiver, wherein the at least one processor controls the transceiver to provide V2V communication via at least one communication link between the transportation vehicle equipment of the transportation vehicle and transportation vehicle equipment of other transportation vehicles of the plurality of transportation vehicles, wherein communication link is provided via either direct radio link or communication via mobile-radio network, wherein communication of the BSMs on the communication link is secured via root certificate such that each BSM is digitally signed using a root certificate associated with the transportation vehicle transmitting a BSM, wherein at least one regional root certificate authority of a plurality of regional root certificate authorities dictate whether identities that associate root certificates with respective transportation vehicles of the plurality of transportation vehicles are legitimate for a jurisdiction for the at least one regional root certificate authority, wherein the jurisdiction includes at least one country associated with the at least one regional root certificate authority, wherein at least two of the plurality of regional root certificate authorities maintain Certificate Trust Lists that include at least one common root certificate identified as a legitimate root certificate in each of the respective jurisdictions of the at least two regional root certificate authorities, each regional root certificate authority being configured to modify Certificate Trust Lists that list legitimate certificates in their jurisdiction using elector-based root management, wherein when a region restriction for a root certificate contains multiple countries, the legitimacy of the root certificate is determined by the respective regional root certificate authority expressed through the regional root certificate authority's respective Certificate Trust List, wherein the elector-based root management uses identified electors to manage trust anchors of the respective Certificate Trust Lists in a standardized manner, wherein root certificates are used across multiple countries and identify the jurisdictions for which the root certificate is valid under IEEE 1609.2 Peer-to-Peer Certificate Distribution such that the elector-based root management functions even if there is a trust compromise on a top level of a trust chain, and wherein the identified electors include at least one common elector identified as legitimate within the respective jurisdictions of the at least two regional root certificate authorities.

22. The non-transitory computer readable medium of claim 21, wherein the elector-based root management is performed using ballots with endorsements, wherein a regional root certificate authority seeking to add or remove a root certificate from its Certificate Trust List queries a majority of electors identified by the regional root certificate authority to sign a ballot to endorse or revoke a root certificate.

23. The non-transitory computer readable medium of claim 21, wherein the plurality of regional root certificate authorities are associated with respective jurisdictions that share a common international border.

24. The non-transitory computer readable medium of claim 21, wherein the root certificate authorities each issue digital certificates including root certificates, wherein the digital certificates certify ownership of a public key by the named subject of the digital certificate.

25. The non-transitory computer readable medium of claim 21, wherein BSMs each include transportation vehicle specific data including time, location, speed, and heading of the BSM transmitting transportation vehicle.

26. The non-transitory computer readable medium of claim 21, wherein the digital signing of the BSM serves as authentication of correctness and reliability of data included in the BSM.

27. The non-transitory computer readable medium of claim 21, wherein the digital signing of the BSM is analyzed by one or more transportation vehicle safety applications running on a transportation vehicle of the plurality of transportation vehicles that receives the BSM via V2V communication prior to the transportation vehicle safety application accessing data of the BSM.

28. The non-transitory computer readable medium of claim 21, wherein the one or more transportation vehicle safety application is an autonomous or assistive driving application.

29. The non-transitory computer readable medium of claim 21, wherein the method is implemented to work automatically without requiring physical access to the transportation vehicle equipment or having the transportation vehicle equipment in a secure environment.

30. The system of claim 29, wherein the automation assists in avoiding mistakes and reducing the recovery time for the system for addressing such mistakes.

* * * * *